United States Patent

Yoshida et al.

[11] Patent Number: 5,790,051
[45] Date of Patent: Aug. 4, 1998

[54] APPARATUS FOR CHECKING FOR LOADING OF A STORAGE MEDIUM

[75] Inventors: Ichiro Yoshida, Takahama; Manabu Matsumoto, Handa, both of Japan

[73] Assignee: Nippondenso Co., Ltd., Kariya, Japan

[21] Appl. No.: 629,512

[22] Filed: Apr. 9, 1996

[30] Foreign Application Priority Data

Apr. 10, 1995 [JP] Japan ................... 7-084014

[51] Int. Cl.⁶ .................................................... G08G 1/00
[52] U.S. Cl. .................. 340/928; 340/933; 340/825.54; 235/380; 235/382; 235/384; 364/467; 307/10.3
[58] Field of Search .................... 340/928, 825.54, 340/933, 428, 426; 235/384, 382, 380; 364/467; 307/10.4, 10.5, 10.3

[56] References Cited

U.S. PATENT DOCUMENTS 4,805,722  2/1989  Keating et al. .................. 307/10.5
5,422,473  6/1995  Kamata ............................ 235/384
5,541,583  7/1996  Mandelbaum ................. 340/825.54

FOREIGN PATENT DOCUMENTS 4-111195  4/1992  Japan.
5-217036  8/1993  Japan.
6-236465  8/1994  Japan.

*Primary Examiner*—Jeffery Hofsass
*Assistant Examiner*—Daryl C. Pope
*Attorney, Agent, or Firm*—Cushman, Darby & Cushman IP Group of Pillsbury, Madison & Sutro, LLP

[57] ABSTRACT

An apparatus has a detector for, when the operation of a vehicle is started, determining whether a specific portable wireless tolling storage medium is loaded in an automatic toll processing unit installed in the vehicle. A warning unit produces a visual or auditory warning if the detector determines that the specific tolling storage medium is not loaded. The apparatus enables realization of a tolling system that prevents incidents where a user neglects to load a tolling storage medium into a toll processing unit, thus ensuring normal toll processing.

18 Claims, 4 Drawing Sheets

APPARATUS FOR CHECKING FOR LOADING OF A STORAGE MEDIUM

CROSS-REFERENCE TO RELATED APPLICATIONS

The present application is related to and claims priority from Japanese Patent Application No. Hei. 7-84014, incorporated herein by reference.

BACKGROUND OF THE INVENTION

1. Field of the Invention

The present invention relates to an apparatus for determining whether a storage medium is loaded in a processing unit, and more particularly relates to an apparatus for determining whether an IC card is loaded in an IC card reader/writer. In an IC card, a chip having data processing and storage functions is integrated with a card-shaped medium to form a "Smart Card" or "Memory Card". The invention is particularly applicable to a charging system that uses an IC card to automatically charge a toll for, e.g., driving on a toll road, and more specifically to a toll charging system that prevents incidents where a user neglects to load a wireless toll charging medium into an automatic toll processing unit installed in a vehicle by producing a warning if the toll processing unit is not loaded with the medium when the vehicle is started.

2. Description of the Related Art

In a known charging system of a type as described above, a storage medium is loaded into a processing unit, and the contents of the storage medium are rewritten at a predetermined timing. More specifically, when a vehicle equipped with an automatic toll charging IC card reader-writer (hereinafter, referred to as an "IU"), i.e., a processing unit, loaded with an IC card, i.e., a storage medium, passes through a tolling area, a road-installed device transmits to the IU radio waves carrying information regarding the toll and the like, and the IU thereby rewrites toll data stored in the IC card. The system thus performs toll charging processing.

However, normal toll charging processing is impossible if a user neglects to load an IC card into an IU and drives through a tolling area.

SUMMARY OF THE INVENTION

Accordingly, it is an object of the present invention to prevent incidents where a user neglects to load a portable storage medium into a processing unit, by determining whether the storage medium has been loaded in the processing unit.

According to an aspect of the present invention, the above object is achieved by providing a system for checking loading of a storage medium, which includes a portable storage medium and a processing unit, loadable with the storage medium, for rewriting at a predetermined timing the contents of the storage medium when loaded with the storage medium, where the processing unit has a determining unit for determining whether the processing unit is loaded with the storage medium.

The storage medium and the processing unit are preferably provided in a vehicle. Preferably, the determining unit determines whether the processing unit is loaded with the storage medium at starting of operation of the vehicle. More preferably, the determining unit determines whether the processing unit is loaded with the storage medium on the basis of a signal from an ignition key that is operated at the starting of operation of the vehicle.

It is preferred that the processing unit further includes a load warning producing unit for producing a warning if the determining unit determines that the processing unit is not loaded with the storage medium. The load warning producing unit preferably produces a visual and/or auditory warning.

According to this feature of the invention, the determining unit determines whether the portable storage medium or the IC card is loaded in the processing unit or the IC card reader-writer installed in a vehicle at the starting of operation of the vehicle on the basis of the ignition key signal. If the determining unit determines that the storage medium is not loaded in the processing unit, the load warning producing unit produces visual and/or auditory warning to a user and, further, the operation inhibiting unit inhibits the operation of the vehicle.

It is also preferred that the processing unit further includes an operation inhibiting unit for inhibiting operation of the vehicle if the determining unit determines that the processing unit is not loaded with the storage medium.

The determining unit preferably determines whether the processing unit is loaded with the storage medium specified for the vehicle.

It is also preferred that the processing unit further includes a power supply monitoring unit for determining whether a level of power supply to the storage medium does not exceed a predetermined voltage. More preferably, the processing unit further includes a low-voltage warning producing unit for producing a warning if the power supply monitoring unit determines that the state of power supply to the storage medium is at not higher than a predetermined voltage.

In addition, the power supply monitoring unit prevents the determining unit from making the wrong determination, based on the low voltage, that the storage medium is not load, when the storage medium is actually loaded. The low-voltage warning producing unit informs a user of the low voltage.

Preferably, the storage medium is an IC card and the processing unit is an IC card reader-writer.

In a preferred construction, the storage medium and the processing unit are applicable to a vehicular automatic tolling system. More preferably, the determining unit determines whether the processing unit is loaded with the storage medium at starting of operation of the vehicle. Furthermore, the processing unit preferably further includes a load warning producing unit for producing a warning for several seconds if the determining unit determines that the processing unit is not loaded with the storage medium.

In a construction preferable for the vehicular automatic toll system, the system further includes a first road-installed device for communicating with the processing unit to instruct the processing unit to rewrite content stored in the storage medium, and a second road-installed device disposed a predetermined distance in front of a location at which communications between the processing unit and the first road-installed device will start, where the second road-installed device transmits a command to cause the determining unit in the processing unit to determine whether the processing unit is loaded with the storage medium. More preferably, the processing unit further includes a load warning producing unit for producing a warning if the determining unit determines that the processing unit is not loaded with the storage medium.

According to another aspect of the invention, the above object is achieved by providing a system for checking for loading of a, storage medium, where the system includes an IC card reader-writer provided in a vehicle for performing automatic toll processing, an IC card in which information regarding the automatic toll processing is stored, an operation start determining unit for determining whether the vehicle is in an operation started state on the basis of a signal from an ignition key that is operated at starting of operation of the vehicle, a determining unit for, when the operation start determining unit determines that the vehicle is in the operation started state, determining whether the IC card reader-writer is loaded with the IC card, and a load warning producing unit for producing an auditory warning if the determining unit determines that the IC card reader-writer is not loaded with the IC card.

In this way, the system prevents an incident where a user neglects to load the storage medium into the processing unit, and ensures normal toll processing of the toll system.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

A preferred embodiment of the present invention will be described hereinafter with reference to the accompanying drawings.

Figure 1:
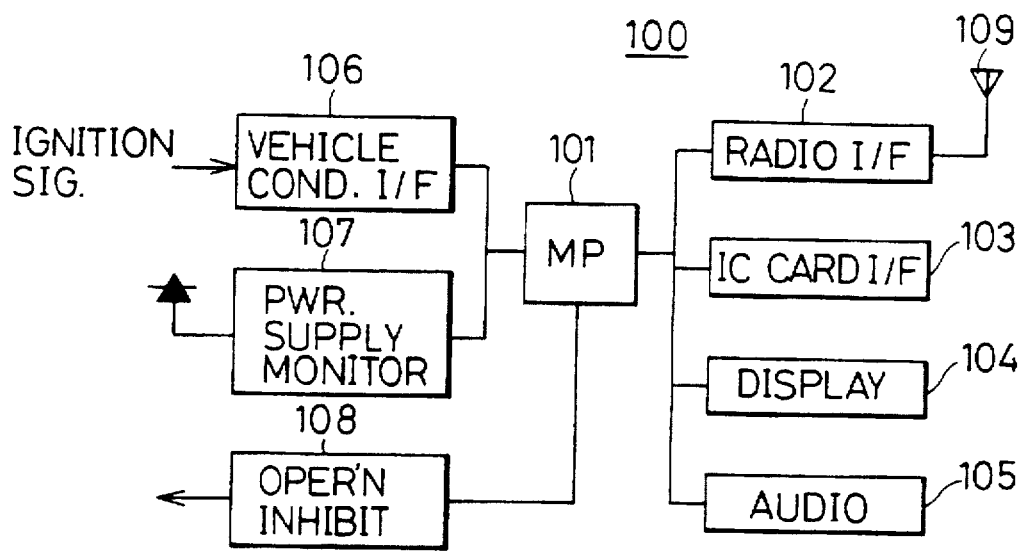
FIG. 1 is a block diagram illustrating the construction of a preferred embodiment of the invention.

FIG. 1 is a block diagram of an automatic toll charging IC card reader-writer 100 constituted as an automatic charge processing unit used in this embodiment of the present invention. The automatic toll charging IC card reader-writer 100 is preferably installed in a vehicle.

A radio wave communication interface 102 shown in FIG. 1 performs modulation and demodulation for predetermined radio wave communications between the card reader-writer 100 and a road-installed device (not shown) by using an antenna 109.

An IC card interface 103 reads predetermined data from or writes predetermined data to an IC card 401 (see FIG. 8) that has been inserted in the automatic toll charging IC card reader-writer 100 and serves as the wireless toll charging storage medium. The IC card interface 103 includes a sensor (not shown) for detecting insertion and removal of the IC card 401.

A display 104 provides a visual interface with a user and includes, for example, a liquid crystal display (LCD) screen, a segmented light emitting diode (LED) display, a plasma display, or a cathode ray tube (CRT).

Figure 8:
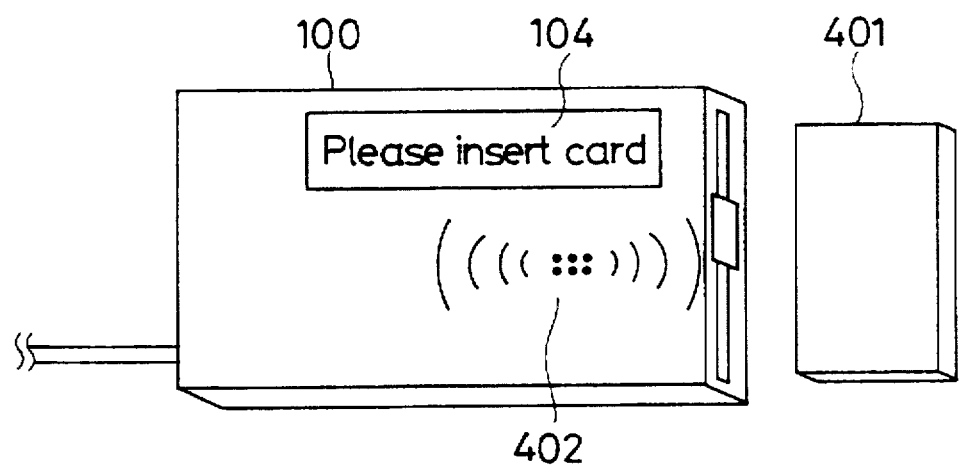
FIG. 8 illustrates an exemplary arrangement of a display according to the embodiment.

An audio (voice) circuit 105 provides an auditory interface with a user and outputs audio signals to, for example, a buzzer or a speaker (providing a sound or voice synthesizing function) 402 (shown in FIG. 8).

A vehicle condition input interface 106 for receiving a signal from a vehicle (not shown) so as to detect the starting of driving operation by a user present in the vehicle. The signal can be produced by, for example, an ignition key 701 as indicated in FIG. 2, which illustrates an exemplary arrangement of the vehicle condition input interface 106.

Figure 2:
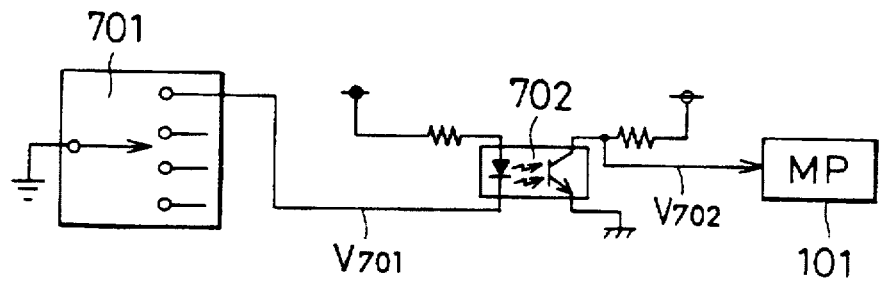
FIG. 2 illustrates an exemplary arrangement of a vehicle condition input interface shown in FIG. 1.
Figure 3:
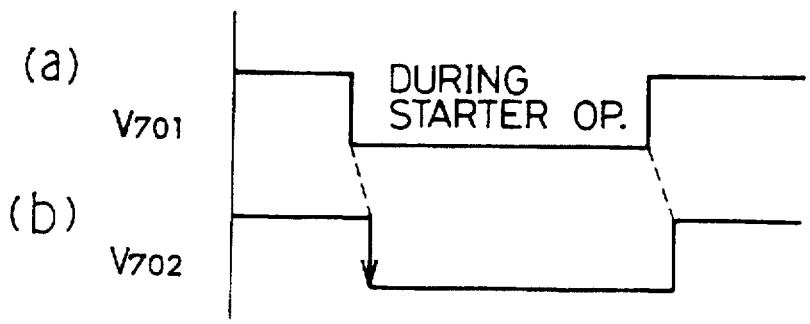
FIGS. 3(a) and 3(b) are timing charts showing the operation of the exemplary arrangement shown in FIG. 2.

Referring to FIG. 2, when the ignition key 701 is set to a starter-ON (that is, start) position, an opto-isolator 702 supplies a microprocessor 101 with a vehicle condition input signal $V_{702}$ that has changed from a high level to a low level corresponding to an ignition key signal $V_{701}$ during the actuation of a starter as shown in FIG. 3(a).

A power supply monitoring interface 107 shown in FIG. 1 monitors at least the power supply to the IC card 401 in the power supply provided for the automatic toll charging IC card reader-writer 100 (hereinafter, referred to as the "vehicle installed device"). For example, the power supply monitoring interface 107 sends a low signal (OFF) to the microprocessor 101 when the power supply to the IC card 401 is less than the minimum operating voltage thereof, and the power supply monitoring interface 107 sends a high signal (ON) to the microprocessor 101 when the power supply is greater than the minimum operating voltage, as indicated in FIGS. 4, 5.

Figure 4:
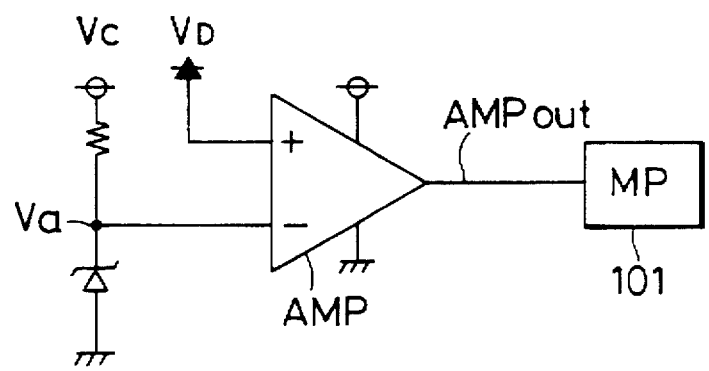
FIG. 4 illustrates an exemplary arrangement of a power supply monitor interface shown in FIG. 1.
Figure 5:
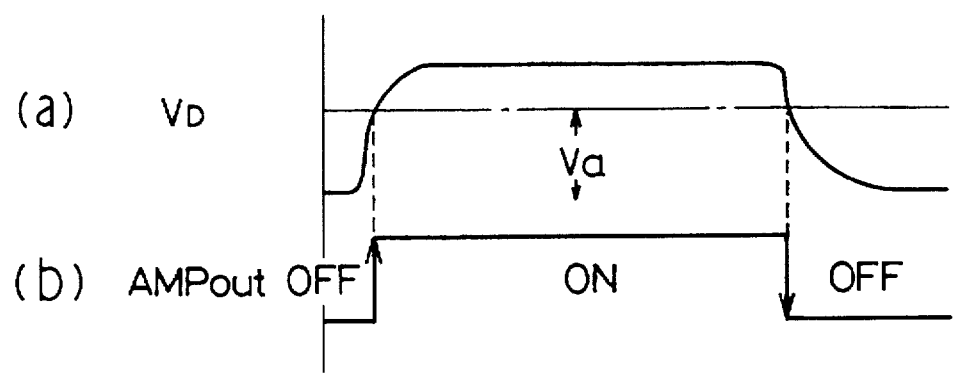
FIGS. 5(a) and 5(b) are timing charts showing the operation of the exemplary arrangement shown in FIG. 4.

As shown in FIG. 4, a differential amplifier AMP outputs the ON, OFF signals as described above and indicated in FIG. 5(b) in the form of an output AMPout, as shown in FIG. 4, by comparing the supply voltage $V_D$ to the IC card 401 (see FIG. 5(a)) with a reference voltage Va from a power source $V_C$ that provides a predetermined voltage independent from the IC card supply voltage $V_D$.

This arrangement prevents the IC card interface 103 from making an incorrect determination, that is, determining that no IC card 401 is loaded, when the IC card 401 is actually loaded but the IC card supply voltage is low.

Figure 6:
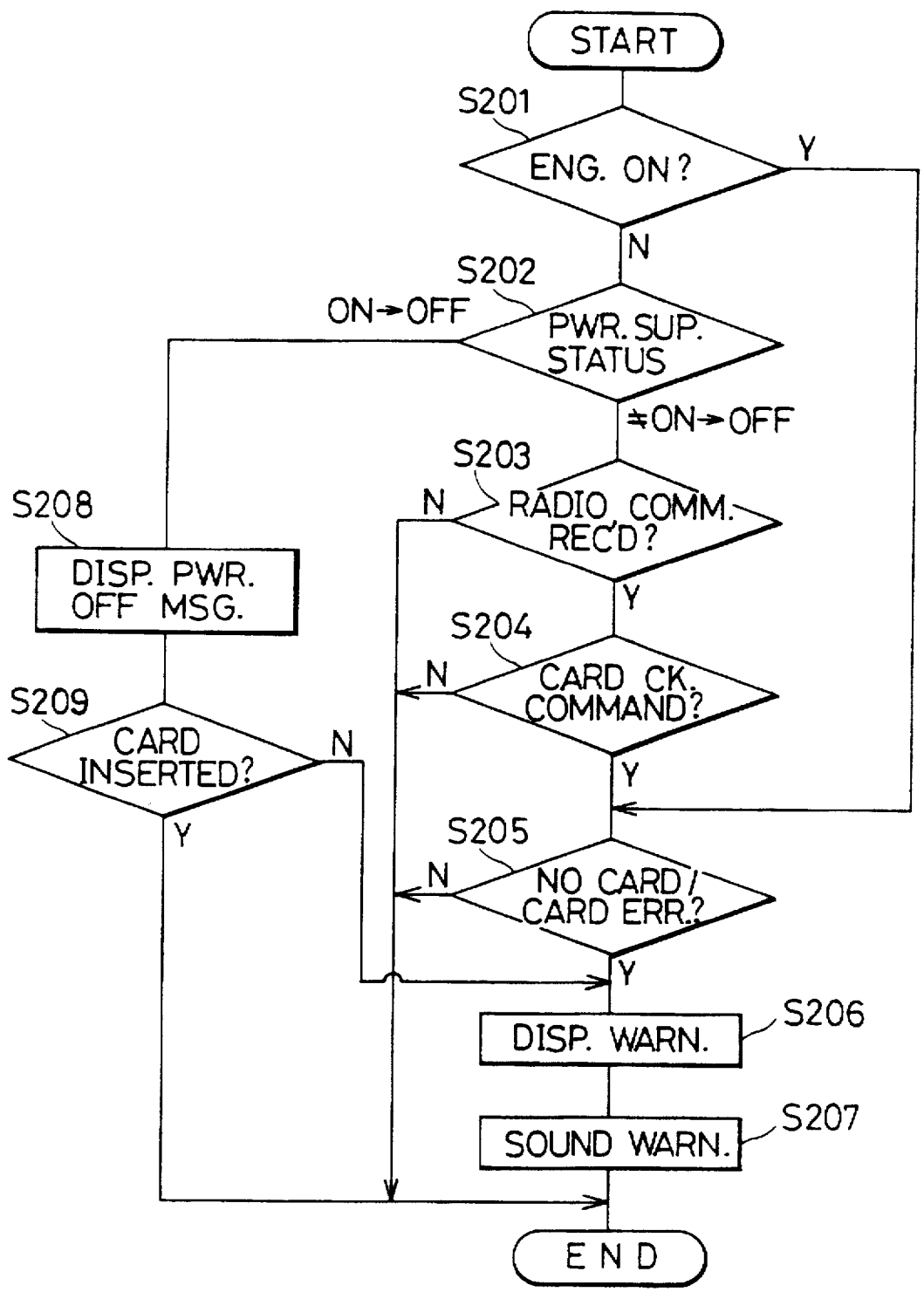
FIG. 6 is a flowchart illustrating the operation of the system shown in FIG. 1.

The interfaces 102–107 and 108 (to be described in greater detail below) are connected to the microprocessor 101 and controlled thereby as follows, according to an operation that is illustrated by the flowchart of FIG. 6 and programmed in the microprocessor 101 as a part of its software.

The operation will be described with reference to the flowchart of FIG. 6. The operation is started by insertion of the ignition key to a key cylinder.

First, a driver gets in the vehicle and starts the engine. Since the ignition key 701 of the vehicle condition interface of the vehicle installed device shown in FIG. 2 is set to the starter-ON position, a voltage is applied to the light emitting diode of the opto-isolator 702 to turn on the phototransistor contained therein. Thereby, the level of the vehicle condition input signal $V_{702}$ changes from high to low as indicated in FIG. 3(b).

The vehicle condition input signal $V_{702}$ is then inputted to the microprocessor 101, so that the microprocessor 101 determines in step S201 whether the engine is started. If so, step 205 determines whether an IC card 401 has been loaded and, in addition, whether a card error has occurred, that is, whether the loaded IC card 401 is a card that has not been specified for the vehicle. If it is determined that the IC card 401 is not present or if the inserted IC card 401 has caused a card error, step 206 displays a warning on the display 104 as in an example shown in FIG. 8.

Subsequently, step 207 produces warning sound or voice, for example, a warning sound from a buzzer or speaker 402, by using the audio circuit 105 as shown in FIG. 1, or a vocal notification such as "No card inserted" or "Please insert card again." The warning should be continued for a sufficient predetermined length of time (e.g., several seconds).

This visual or auditory warning can prevent continuation of the non-card loaded state or the card error state. Because the warning is provided before the vehicle starts traveling, not during traveling, the user can safely handle the card to insert it into the vehicle installed device. Optionally, if administrative personnel or the like desire that insertion of the IC card 401 into the vehicle installed device be compulsory to drive the vehicle, it is possible to inhibit the engine from operating (by, for example, a fuel cutoff operation) by using an operation inhibiting circuit 108 shown in FIG. 1 unless the IC card 401 is inserted.

Figure 9:
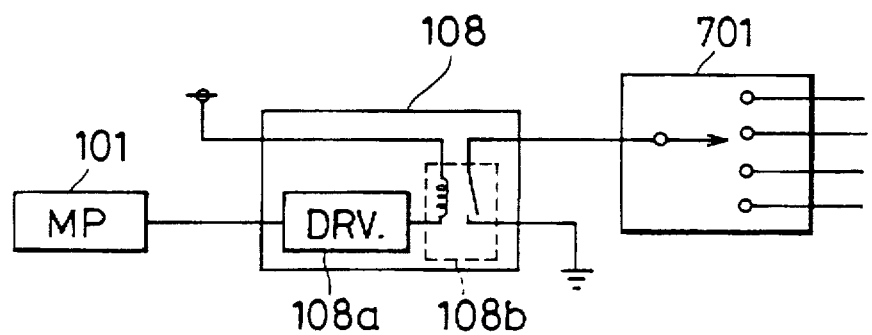
FIG. 9 illustrates an exemplary arrangement of an ignition key according to the embodiment.

The operation inhibiting circuit 108 includes a driver 108a and a relay 108b as shown in FIG. 9. When properly reading the IC card 401, the microprocessor 101 drives the driver 108a to close the contacts of the relay 108b so that the pole of the ignition switch 701 is connected to ground. The ignition switch thus becomes operable.

To avoid problems that could be caused if the contacts of the relay 108b were opened while the vehicle is traveling, the wiring of the common line of the ignition key 701 may be arranged to inhibit only the operation of the starter, rather than the ignition switch 701.

If an abnormality occurs in conjunction with the power supply while the vehicle is traveling, the power supply monitoring interface 107 shown in FIG. 4 supplies the microprocessor 101 with a signal AMPout as indicated in FIG. 5(b).

If the microprocessor 101 then determines in the power supply monitoring of step S202 that the power supply has become off (changed from ON to OFF), step S208 notifies the user of the power-off event by, for example, displaying "POWER OFF" on the display 104. Then, step 209 determines whether the IC card 401 has been inserted.

If step 209 determines that the IC card 401 has not been inserted, the microprocessor 101 repeats steps S206 and S207 to warn the driver.

Figure 7:
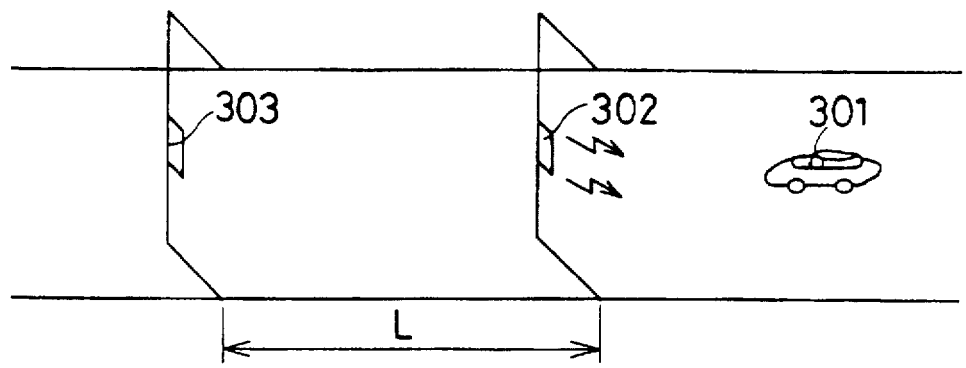
FIG. 7 illustrates a road-installed device arrangement according to the embodiment.

FIG. 7 shows an arrangement of road-installed devices for a tolling area.

In this arrangement, a road-installed device 302 for IC card checking and traffic information communications is provided a distance L in front of a road-installed device 303.

When the vehicle-installed device 100 receives an IC check command from the road-installed device 302 as a vehicle 301 equipped with the vehicle-installed device 100 passes by the road-installed device 302, step S203 shown in FIG. 6 determines that a radio wave communication has occurred, and then step 204 decodes the check command. If step 205 determines that no IC card has been inserted or that a card error has occurred, steps S206 and S207 warn the driver as described above.

If the driver inserts the IC card 401 before the vehicle has traveled through the distance L, normal toll processing can be performed. Thus, this arrangement can eliminate the incident where no IC card is inserted in a vehicle-installed device before the vehicle enters the tolling area.

Although not illustrated in FIG. 6, the vehicle-installed device may perform the reading operation again if a card error has occurred.

In addition, the road-installed device 302 may be connected to a GPS system that transmits traffic information or the present position to vehicle-installed devices and thereby provide drivers with such information.

By the operation described above, the embodiment will warn a driver if the IC card 401 is not inserted, thus improving the performance of normal toll processing.

Although the embodiment has been described in conjunction with the IC card 401 used as the wireless tolling storage medium, the wireless tolling storage medium may be any portable wireless tolling medium. Thus, the embodiment has a wide variety of applications besides IC cards.

The present invention is not limited to the embodiment described above, but may be modified in various manners.

For example, although step S201 shown in FIG. 6 is followed by step S205 while the ignition key 701 is switched to the starter-ON (start) position, step S205 may be performed only once after it is determined that the engine operation has been started by the ignition key 701 switched to the starter-ON (start) position. The start of engine operation can be determined on the basis of, for example, an engine speed signal.

As described above, the system of the present invention will determine whether the vehicle-installed device has been loaded with a predetermined portable wireless tolling medium when operation of the vehicle is started. Thus, the invention allows for realization of a tolling system that prevents incidents where a user neglects to load the wireless tolling medium and that thereby ensures normal toll processing.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A toll charging system comprising:
   a storage medium for storing information concerning vehicle toll charging processing;
   a storage medium reader-writer, provided in a vehicle, for performing vehicle toll charging processing by writing information in said storage medium and reading said information from said storage medium;
   operation start determining means for determining whether said vehicle is in an operation started state;
   determining means for, when said operation start determining means determines that said vehicle is in said operation started state, determining whether said storage medium reader-writer is loaded with said storage medium; and
   notifying means for notifying a driver that said storage medium reader-writer is not loaded with said storage medium if said determining means determines that said storage medium reader-writer is not loaded with said storage medium.

2. The system of claim 1, wherein said operation start determining means determines whether an engine of said vehicle has started.

3. The system of claim 1, wherein said operation start determining means determines whether a signal from an ignition key switch has been generated.

4. The system of claim 1, wherein said determining means is for determining whether said storage medium specified for said vehicle is received by said.

5. The system of claim 1, wherein said notifying means comprises vehicle inhibiting means for inhibiting a portion of said vehicle from operating when said determining means determines that a storage medium is not received by said reader-writer.

6. The system of claim 5, wherein said vehicle inhibiting means is for inhibiting operation of an electrical system of said vehicle.

7. The system of claim 6, wherein said vehicle inhibiting means is for inhibiting operation of a starter of said vehicle.

8. The system of claim 1, wherein said storage medium is an IC card and said reader-writer is an IC card writer.

9. The system of claim 1, wherein said notifying means is for generating an audible warning.

10. The system of claim 1, wherein said notifying means is for generating a visual warning.

11. The system according to claim 1, wherein said reader-writer further comprises power supply monitoring means for determining whether a level of power supply to said storage medium does not exceed a predetermined voltage.

12. The system according to claim 11, wherein said reader-writer further comprises low-voltage warning producing means for producing a warning if said power supply monitoring means determines that said level of power supply to said storage medium does not exceed said predetermined voltage.

13. A toll charging system comprising:
   a first road-installed device for transmitting a first command to a vehicle passing proximate thereto to cause said vehicle to determine whether a storage unit is received by a toll charging unit in said vehicle;
   a second road-installed device for transmitting a second command to said vehicle proximate thereto to cause said toll charging unit to write information concerning a toll in said storage unit; and
   notifying means for notifying a driver that said toll charging unit is not loaded with said storage unit if said vehicle determines that said toll charging unit is not loaded with said storage unit;
   wherein said first road-installed device is positioned before said second road-installed device in a direction of travel of vehicles so that said vehicles receive said first command from said first road-installed device before said vehicles receive said second command from said second road-installed device.

14. An apparatus for checking loading of a storage medium in which information regarding automatic toll processing may be stored, said apparatus comprising:
   an IC card reader-writer, provided in a vehicle, for performing automatic toll processing;
   operation start determining means for determining whether said vehicle is in an operation started state, based on a signal from an ignition key switch that is operated at starting of operation of said vehicle;
   determining means for, when said operation start determining means determines that said vehicle is in said operation started state, determining whether said IC card reader-writer is loaded with said IC card; and
   load warning producing means for producing an auditory warning if said determining means determines that said IC card reader-writer is not loaded with said IC card.

15. A method of performing vehicle toll charging, said method comprising:
   determining whether a vehicle is in an operation started state;
   determining whether a storage medium which stores information concerning vehicle toll charging processing is loaded in a processing unit when said vehicle is in said operation started state;
   notifying a driver in said vehicle that said storage medium is not loaded in said processing unit when said determining step determines that said storage medium is not loaded in said processing unit; and
   processing a toll charge by writing information in said storage medium and reading said information from said storage medium when said determining step determines that said storage medium is loaded in said processing unit.

16. The method of claim 15, further comprising:
   sending a storage medium check command from a road-installed device to said processing unit;
   wherein said determining step is performed responsive to said sending step.

17. The method of claim 15, wherein said notifying step includes inhibiting operation of a portion of an electrical system of said vehicle.

18. The method of claim 17, wherein said portion is a starter of said vehicle.

* * * * *